W. W. SWAN.
MEASURING DEVICE FOR SEEDING MACHINES.
APPLICATION FILED FEB. 6, 1911.
1,044,103.
Patented Nov. 12, 1912.
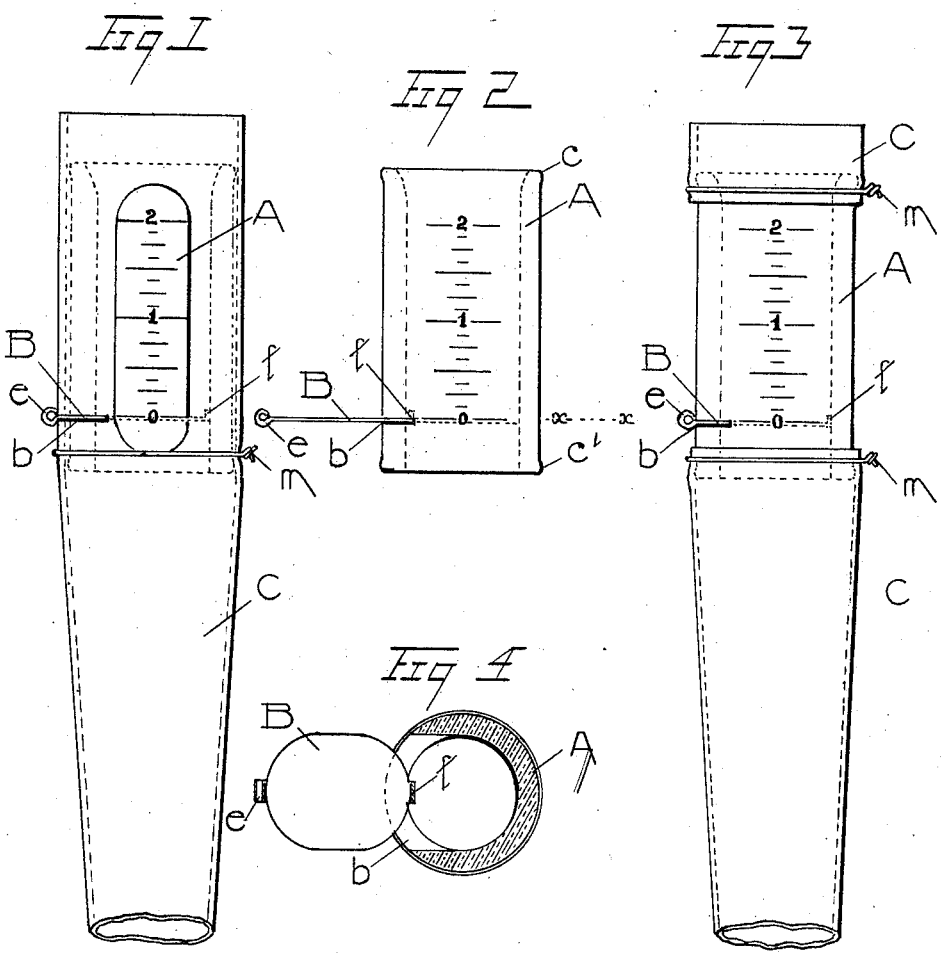

UNITED STATES PATENT OFFICE.

WILLIAM W. SWAN, OF TACOMA, WASHINGTON.

MEASURING DEVICE FOR SEEDING-MACHINES.

1,044,103.  Specification of Letters Patent.  Patented Nov. 12, 1912.

Application filed February 6, 1911. Serial No. 606,978.

*To all whom it may concern:*

Be it known that I, WILLIAM WALLACE SWAN, a citizen of the United States, residing at Tacoma, in the county of Pierce and State of Washington, have invented a new and useful Measuring Device for Seeding-Machines, of which the following is a specification.

This invention relates to devices for determining the amount of seed being sown on a given area of land; and has for its object to provide a reliable means to determine accurately and quickly at any time, the amount of seed being sown per acre by a drill, seeder or planter; and with this end in view, a seed drill or planter is provided with a graduated measure on a reduced scale, the gradations of the scale bearing the same proportion to a bushel, that the area seeded by a single shoe of the drill in a given distance bears to an acre.

This invention is designed to be used as a component part of one of the seed-dropping tubes, or entirely detached from the drill as desired.

Heretofore the method of determining the rate of sowing, has been a matter of calculation, based on the number of bushels sown, the number of rounds, the length of the field, and the width of the planter. After, say a half day's sowing, in solving the above problem, the careful farmer may find he has sown a peck or more, too much or too little per acre; he not only loses the surplus seed, but may have a greatly reduced crop, owing to too thick or too thin a stand.

An ordinary drill may be set in a certain notch to sow according to directions one bushel of wheat per acre; but owing to variations in moisture, size, and weight of different seed, it may be actually sowing anywhere from one half to two bushels per acre, with a consequent very heavy loss to the farmer. By the use of my invention, a farmer may at any time in a few moments, determine the rate at which his planter is sowing thus obviously avoiding very expensive mistakes.

With these and other objects in view, which will readily appear as the nature of the invention is better understood, the same consists in the novel construction, combination, and arrangement of parts hereinafter more fully described, illustrated, and claimed.

In the accompanying drawing:—Figure 1 is a side elevation of the upper portion of a grain-drill seed-dropping tube with my invention applied thereto. Fig. 2 is a side elevation of my invention. Fig. 3 is an elevation, showing the method of applying my invention, by cutting the seed-tube into two parts. Fig. 4 is a cross-sectional view on the line $x$—$x$ of Fig. 2.

Referring to the accompanying drawings, A represents a graduated measure on a reduced scale, which is preferably of a cylindrical form, and made of transparent material. A is provided with a scale as shown, the gradations of which bear the same ratio to a bushel or other accepted unit of measure, that a much smaller specified area bears to an acre or other accepted unit of area. A is provided at its ends with suitable annular flanges $c$, $c'$, to facilitate connection with a seed-dropping tube and prevent slipping. The figures of the scale inscribed on A, represent units of seed measure per units of land surface, and the marks of the scale fractions thereof. The said measure A is provided at or near its lower end with a thin bottom of suitable material, adapted to slide open and shut through the slot $b$.

The bottom-gate B is provided at its inner end with a stop $f$ to prevent its coming entirely out, and at its outer end with a grip device $e$, to facilitate opening. A is provided with a slot $b$, in which B is adapted to slide with its upper surface in the zero plane of the scale, as shown. When A is inserted in an ordinary seed-tube, a suitable slot is cut in the seed-tube, exposing the scale and contents of A; a suitable slit is also provided in the seed-tube C for the sliding bottom B. The wires $m$, $m$, hold A securely in position, whether A is attached as in Fig. 1, or with the seed tube cut in two pieces, as in Fig. 3.

In actual use I prefer to have my device attached to one of the seed-tubes of a drill as illustrated, or in any other suitable manner; though it may be used entirely separate from the seed-tube, by corking or stopping one of the seed-tubes, and afterward sealing its contents with A when the drill has been moved the required distance for a test.

My invention is operated as follows: The farmer sets the feed of his drill according to the directions, at the rate he wishes to sow per acre; he then measures ahead from the point on which one of the seeder-wheels rests the distance on which the scale of A is based, which may be taken for illustration at, say, two rods; he makes a mark at this point, then closes the bottom B of the tester A, drives ahead until his wheel-base rests on the said mark and stops; the surface of the contents of the tester will now be at the mark of the scale showing the exact rate of seeding in bushels and fractions thereof per acre, or in other terms as the case may be. If the operator sets his feed at say one and one half bushels per acre, a test may show the drill is feeding considerably under or over this mark, and he therefore readjusts the feeding mechanism, until it is right. It will be readily understood that the operator can at any time, in a few moments, make a new test, and always be sure of the way his drill is sowing.

My invention may be made of any suitable material, but I prefer a transparent substance such as glass, which furnishes the best facilities for comparing the level of the seed in the tester with the inscribed scale, although it is obvious that a suitably perforated or slotted opaque substance would answer the purpose.

The principle of my invention is a graduated measure, whose units are to the units of seed measure used, as a specified number of feet of drill-row, are to the total number of feet of drill-row in the unit of land area used.

Changes in the form, proportion, and minor details of construction may be resorted to, without departing from any of the principles, or sacrificing any of the advantages of this invention.

Having thus described the invention, what is claimed, and desired to be secured by Letters Patent is—

1. In a machine adapted to feed seed through drill-tubes in proportion to the distance traveled through by the machine, the combination with a seed drill-tube; of a seed receptacle adapted to receive the seed therefrom, whereby the rate at which the seed is being fed through the tube may be determined.

2. In a machine adapted to feed seed through drill-tubes in proportion to the distance traveled through by the machine, the combination with a seed drill-tube; of a seed receptacle adapted to receive the seed therefrom; and a removable gate in the bottom of said receptacle whereby when said gate is closed the rate at which the seed is being fed through the tube may be determined, and when the gate is opened the seed passes directly through the receptacle.

3. In a machine adapted to feed seed through drill-tubes in proportion to the distance traveled through by the machine, the combination with a seed drill-tube; of a seed receptacle adapted to receive the seed therefrom; and graduations formed on said receptacle whereby the rate at which the seed is being fed through the tube may be determined.

4. In a machine adapted to feed seed through drill-tubes in proportion to the distance traveled through by the machine, the combination with a seed drill-tube; of a seed receptacle adapted to receive the seed therefrom; a removable gate in the bottom of said receptacle adapted to close the receptacle against the passage of seed therethrough; and graduations formed on said receptacle whereby the rate at which the seed is being fed through the tube may be determined.

In testimony that I claim the foregoing as my own, I have hereto affixed my signature in the presence of two witnesses.

WILLIAM W. SWAN.

Witnesses:
M. G. BERGE,
A. R. TOLLIFSON.

---

Copies of this patent may be obtained for five cents each, by addressing the "Commissioner of Patents, Washington, D. C."